US005468568A

United States Patent [19]

Kühn et al.

[11] Patent Number: 5,468,568

[45] Date of Patent: Nov. 21, 1995

[54] PRINTING ROLLER WITH A SLEEVE OF THERMALLY WOUND FIBER-REINFORCED THERMOPLASTICS AND A PLASMA-SPRAYED COATING OF COPPER OR COPPER ALLOY

[75] Inventors: Heinrich Kühn, Brechen; Frank Herberg, Frankfurt am Main; Dieter Jaculi, Bad Homburg, all of Germany

[73] Assignee: Hoechst Aktiengesellschaft, Frankfurt am Main, Germany

[21] Appl. No.: 228,425

[22] Filed: Apr. 15, 1994

[30] Foreign Application Priority Data

Apr. 19, 1993 [DE] Germany ............................ 9305806 U

[51] Int. Cl.[6] ........................................ B32B 9/00

[52] U.S. Cl. ........................ 428/245; 428/297; 428/304.4; 428/224; 101/217; 101/375; 101/389.1; 101/415.1

[58] Field of Search .................................... 428/909, 245, 428/297, 304.4; 101/217, 375, 389.1

[56] References Cited

U.S. PATENT DOCUMENTS

| | | | |
|---|---|---|---|
| 3,045,595 | 7/1962 | Gurin | 428/909 |
| 4,093,764 | 6/1978 | Duckett et al. | 428/909 |
| 4,469,729 | 9/1984 | Watanabe et al. | 428/909 |
| 4,503,769 | 3/1985 | Anderson | 101/153 |
| 4,817,527 | 4/1989 | Wouch et al. | 428/909 |
| 5,245,923 | 9/1993 | Vrotacoe | 428/909 |

FOREIGN PATENT DOCUMENTS

| | | |
|---|---|---|
| 38385 | 10/1981 | European Pat. Off. . |
| 278017 | 8/1988 | European Pat. Off. . |

*Primary Examiner*—Patrick J. Ryan
*Assistant Examiner*—Kam F. Lee
*Attorney, Agent, or Firm*—Foley & Lardner

[57] ABSTRACT

The printing roller according to the invention comprises a core cylinder and a sleeve of plastic. The sleeve is built up from a tubular base body composed of a fiber-reinforced thermoplastic material and the base body is coated on its outer surface with a layer, produced by plasma-spraying, of copper or a copper alloy.

20 Claims, 1 Drawing Sheet

FIG. 1A
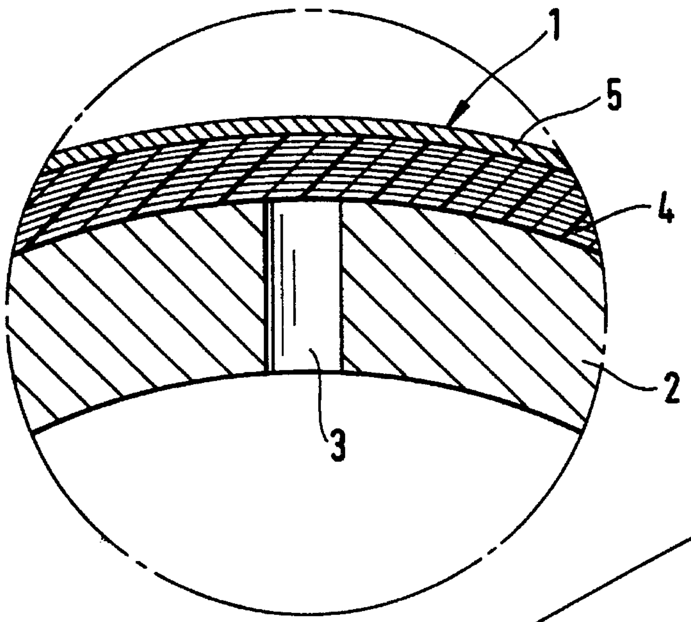
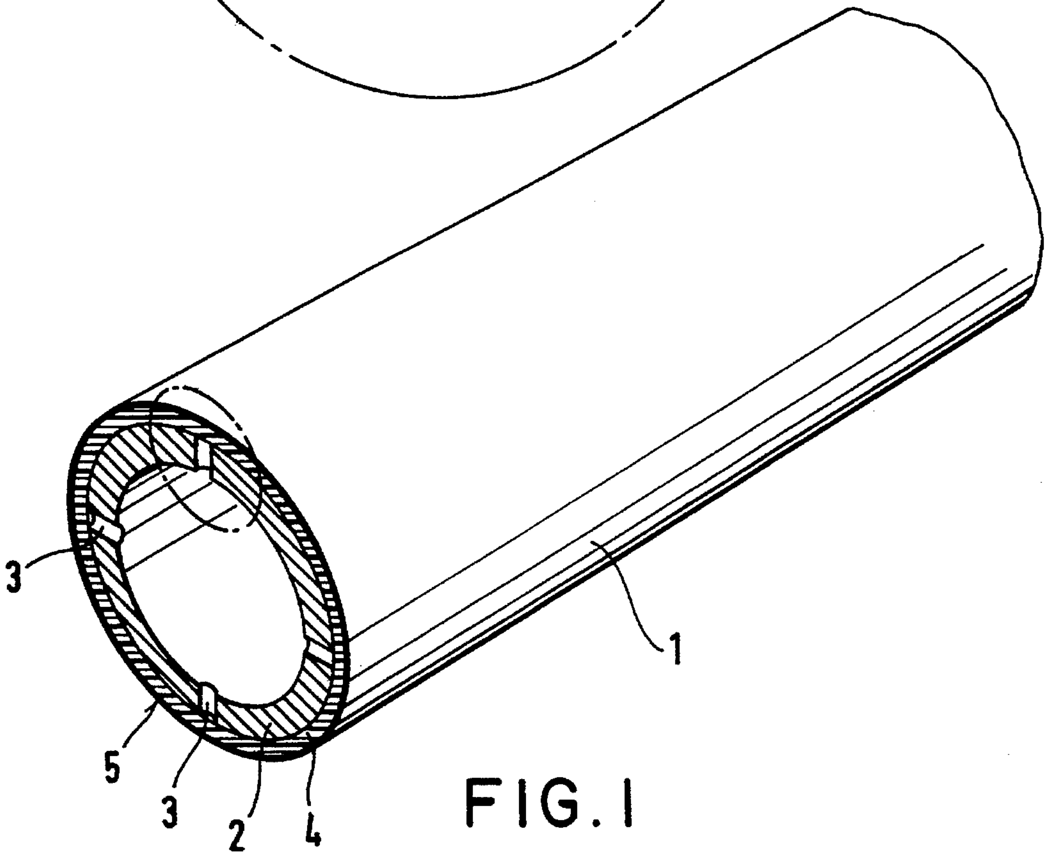
FIG. 1

PRINTING ROLLER WITH A SLEEVE OF THERMALLY WOUND FIBER-REINFORCED THERMOPLASTICS AND A PLASMA-SPRAYED COATING OF COPPER OR COPPER ALLOY

The invention relates to a printing roller with a core cylinder and a removable sleeve.

For the gravure printing process, solid steel rollers are usually coated by electrodeposition with a copper layer which has a layer thickness in the range from 0.2 to 3.0 mm. The engraving necessary for the gravure printing process can be introduced into this copper layer either chemically, mechanically or by means of the laser technology.

In the field of flexographic printing, the sleeve technique has proved suitable, wherein removable sleeves of nickel or thermosetting fiber composites, which are additionally also coated with rubber, are used. The sleeves are pneumatically drawn onto the roller core of metal and can easily be removed again after use. For the gravure printing process, however, this technique has hitherto not been feasible, because it has hitherto not been possible to provide suitable sleeves with a mechanically workable copper layer.

It was the object of the present invention to provide a printing roller for the gravure printing process, which permits the functional profile to be changed according to the sleeve technique without great technical cost. In this case, it is not the complete roller which is to be replaced, but only a sleeve, in order thus to obtain shorter standstill times of the press in combination with a lower cost for stock holding and the transport of steel rollers, and higher flexibility in operation.

The present invention achieves this object by means of a printing roller of the generic type described at the outset, wherein the sleeve comprises a tubular base body of a fiber-reinforced thermoplastic material and wherein the base body is coated on its outer surface with a plasma-sprayed layer of copper or a copper alloy.

Preferably, the plastic matrix of the fiber-reinforced thermoplastic material has been melted by the action of heat, so that: the individual layers are welded together while preserving the fiber matrix distribution of the fiber-reinforced thermoplastic material in the base body with simultaneous formation of homogeneous matrix-rich surface.

The fiber-reinforced thermoplastic material contains carbon fibers, glass fibers, aramid fibers, metal fibers, ceramic fibers, boron fibers or else other fibers as endless fibers or long fibers. Any desired combination of different fiber materials within the base body is also possible.

According to the invention, the matrix system is composed of thermoplastics such as, for example, polypropylene (PP), polyamides (PA) such as polyhexamethyleneadipamide or poly-$\epsilon$-caprolactam, high-pressure or low-pressure polyethylene (PE), poly(phenylene sulfide) (PPS), polycarbonate (PC), polyoxymethylene (POM, polyether-ether-ketones (PEK) or of thermoplastic polyesters such as, for example, poly(ethylene terephthalate) (PET) or poly (butylene terephthalate) (PBT).

The fiber-reinforced thermoplastic material is present in the form of impregnated strips or fabrics. The fiber content is 30 to 80% by weight, preferably 50 to 75% by weight. The preparation of these strips (tapes) is carried out, for example, by melt impregnation, powder impregnation or suspension impregnation in the pultrusion process.

To produce base bodies of the type according to the invention, several layers of a fiber-reinforced thermoplastic material are applied to a support, which can be composed of metal, for example, and consolidated on-line. For this purpose, the support is set into rotation and wound with the fiber-reinforced thermoplastic material which is present in the form of one or more strips or fabrics. The winding angle is variably adjustable in a range from 0° to ±90°.

BRIEF DESCRIPTION OF THE DRAWINGS

FIG. 1 illustrates an oblique view of a printing roller of the present invention.

FIG. 1A illustrates an enlarged section of FIG. 1.

DETAILED DESCRIPTION OF PREFERRED EMBODIMENTS

To illustrate the invention, FIGS. 1 and FIGS. 1A are attached which show an oblique view of a printing roller and an enlarged section of a printing roller, respectively. Using reference numerals, the printing roller 1 is shown in FIG. 1 and, in the enlargement of FIG. 1A, the core cylinder 2 with a bore 3 for pneumatic removal of the sleeve composed of the fiber-reinforced thermoplastic base body 4 with the copper layer 5 can be seen.

The plastic matrix of the fiber composite strip is converted into a molten state by the action of heat, for example, with the aid of a gas burner.

In a particular embodiment variant of the invention, a further, likewise fiber-reinforced thermoplastic material can be applied in a high matrix proportion both before the application and after the application of the fiber-reinforced thermoplastic material described above to the support. The fiber content of this second material is substantially lower than that of the first material and amounts preferably to 1 to 30% by weight, particularly preferably 5 to 15% by weight.

According to the invention, a very homogeneous matrix-rich surface is obtained in this way. A subsequent mechanical working of the base body is considerably facilitated in this way since, owing to the matrix-rich surface, there is no risk, during subsequent mechanical working of the base body, in particular by rotation or chaffing, of fiber layers close to the surface being severed, which would lead to a weakening and distortion of the base body.

In a further embodiment of the invention, in place of a second thermoplastic material of low fiber content, a thermoplastic film strip is: applied to the first material and likewise welded under the action of heat to the fiber-rich material. According to the invention, a very homogeneous, smooth, matrix-rich surface is obtained in this way. The surface is preferably smoothed using a device which possesses anti-adhesive properties.

The base body described above advantageously has a particularly high precision with respect to its geometrical dimensions. Thus, for example, it is possible to produce a shaped object of 1 meter in length with a diameter of 100 mm and a wall thickness of ≦3 mm with a wall thickness tolerance of ± 0.3 mm, preferably ±0.2 mm.

The plasma-sprayed copper layer is applied directly to the matrix-rich outer surface of the base body. For this purpose, the surface is first subjected to a toughening process, without major changes to the surface geometry thereof. Preferably, the surface is treated by a sand blasting process in preparation for the application of the copper layer. For this purpose, roughening of the surface by means of sand blasting apparatus can be provided, the blasting agent preferably being mineral blasting material, such as fine-grained alumina, zircon corundum and others. Preferred sand blasting conditions are here a blasting pressure in the range from 1 to 3 bar, a grain size in the range from 20 to 200 μm, a distance of the nozzle from the surface to be treated in the range from 90 to 120 mm and a movement of the nozzle across the treated surface at a speed in the range from 0.5 to 1 m/second. The micro surface roughness $R_a$ of the base body treated in this way is in the range from 6 to 10 μm, measured according to DIN 4768. The macro structure remains unchanged, and there are no fiber outbreaks into the surface.

Expediently, the roughening process is followed by a cleaning process by means of compressed air or in an aqueous cleaning bath, if necessary with ultrasonic assistance. Within the scope of the invention, the cleaning process ensures that any impurities which may still be present on the surface are effectively removed.

The application of copper and copper alloys is carried out according to the invention by thermal spraying of pulverulent material having a particle diameter $D_{50}$ of ≦20 μm. According to the invention, preferably plasma-spraying and high-speed flame-spraying are employed. The nature of the copper powder is matched to the different thermal spraying processes. The copper powder preferably has a grain size $D_{50}$ in the range from 8 to 12 μm, which is determined by the Cilas laser diffraction analysis method. The phosphorus content of the copper or of the copper alloy is in the range from 0.08 to 0.15% and is determined photometrically, while the oxygen content is in the range from 0.2 to 0.3% and is determined by hot extraction in a stream of inert gas. Surprisingly, it has been found that a phosphorus content of preferably 0.10 to 0.12% has, as a deoxidant, positive effects on the oxidation behavior of the applied copper layer. Apart from pure copper, copper alloys can also be used such as, for example, copper-zinc, copper-tin, copper-aluminum, copper-nickel or copper-nickel-zinc, which can additionally contain further alloy constituents such as, for example, iron, manganese, silicon or lead.

In the plasma-spraying process, an inert gas or an inert gas mixture is used as the plasma gas, preferably argon at a rate in the range from 30 to 60 l/min. The electric rating of the plasma burner is preferably 10 to 15 kW, particularly preferably 12 kW. The burner is moved past the rotationally symmetrical base body at a distance in the range from 40 to 100 mm, preferably from 40 to 70 mm, at a speed of 10 to 100 mm/min. Under such conditions, an application rate in the range from 2 to 8 kg/hour is reached.

During the coating step, the base body is preferably cooled in order to minimize the formation of oxide and to prevent internal strains both in the coating and in the base body. For this purpose, preferably $CO_2$ in the finely crystalline form is used at a high pressure of about 40 to 60 bar. Although it is known that $CO_2$ is used for cooling in thermal spraying, it is surprising to a person skilled in the art that blasting of the surface by $CO_2$ takes place simultaneously, with the result that embedding of highly oxidized, interfering very small particles into the coating is suppressed.

The micro grain size of the copper powder has the effect that the plasma process can be operated at lower energy. By drawing the base body over a carrier of metal of high heat conductivity, for example aluminum, good heat removal during coating is achieved. Copper layers which have been applied as described above can have a layer thickness in the range from 50 to 500 μm, preferably from 100 to 300 μm, in one working pass, the uniformity of thickness then fluctuating by only 5 to 10%. The application in one layer has the effect that the coating does not contain any oxide interlayers. The copper layer can be particularly readily worked by turning to give a dimensionally accurate body. Pore-free, uniform surfaces having roughnesses of $R_a$≦0.1 μm are obtained.

For the finished printing roller, the copper layer is also structured mechanically or by means of laser technology. The sleeve can be drawn positively over a printing cylinder, for example of metal.

EXAMPLE 1

A base body of polyamide 6 with 65% glass fiber content and having an internal diameter of 100 mm, a length of 800 mm and a wall thickness of 1.8 mm was produced on a metallic aluminum support with uniform rotation in a winding machine by first winding the glass fiber-reinforced polyamide material in the peripheral direction at an angle of almost 90°, relative to the axis of the rotating body (="90° ply"). The strip deposition speed was 0.3 m/s, at a strip tension of 50 N/mm$^2$. The plastic matrix of the fiber composite strip was converted into a molten state by means of a gas burner.

After the "90° plies" cross-windings at a variable angle of ±55° C. of a fiber composite material of polyamide 6 with 65% by weight of glass fiber were applied, and the still molten or plastifiable matrix was then smoothed by means of an additional contact and smoothing roller.

For the application of the copper layer, the matrix-rich surface was then toughened by sand blasting. The blasting agent used was electrocorundum, which is an alumina powder having a content of 3% of titanium dioxide and a grain size in the range from 63 to 149 μm. The blasting pressure was 2 bar at a blasting distance of 80 mm and a blasting nozzle diameter of 4 mm. After the roughening, the surface was cleaned by purified compressed air. The surface of the base body, treated in this way, was coated by plasma-spraying with a copper powder having a grain size $D_{50}$ in the range from 8 to 10 μm. The plasma gas used was argon. The burner rating was 12 kW and the burner was moved at a distance of 60 mm with a speed of 100 mm/m over the base body rotating at a speed of rotation of 300 rpm. At the same time, the surface of the base body was cooled in the region of the plasma flame with $CO_2$ under a pressure of 60 bar, and non-adhering material was removed by blasting with solid $CO_2$.

The copper layer thus produced had a layer thickness of 300 μm. The copper surface was very easy to work mechanically with polycrystalline diamond. After a reduction in diameter by 0.15 mm, a pore-free surface having a roughness $R_a$ of 0.1 μm, measured according to DIN 4768, was obtained. The dimensional deviation of the finished sleeve was 0.02 mm, while its positional deviation was 0.03 mm, in each case determined according to DIN ISO 1101.

The sleeve thus produced was removed pneumatically from the metal support by means of compressed air and stored for a period of 4 weeks. The sleeve was then again drawn over the support and gave the same dimensional and positional deviations as during the original production.

We claim:

1. A printing roller, comprising a core cylinder and a sleeve of plastic, said sleeve comprising a tubular base body composed of fiber-reinforced thermoplastic material and a plasma-sprayed layer of copper or copper alloy coated on the outer surface of the tubular base body.

2. The printing roller as claimed in claim 1, wherein the core cylinder is formed as a hollow body of metal.

3. The printing roller as claimed in claim 1, wherein the core cylinder is formed as a hollow body of thermoplastic fiber composites.

4. The printing roller as claimed in claim 1, wherein the core cylinder is formed as a hollow body of thermosetting fiber composites.

5. The printing roller as claimed in claim 1, wherein the core cylinder is tapered on at least one end face.

6. The printing roller as claimed in claim 5, wherein the core cylinder has radial bores along its longitudinal axis.

7. The printing roller as claimed in claim 1, wherein the fiber-reinforced thermoplastic material contains carbon fibers, glass fibers, aramid fibers, metal fibers, ceramic fibers, boron fibers, or other fibers as endless fibers or long fibers in the form of impregnated strips or fabrics.

8. The printing roller as claimed in claim 7, wherein the fiber content of the fiber-reinforced material lies within the range between 30 and 80% by weight.

9. The printing roller as claimed in claim 7, wherein the fiber content lies within the range of between 50 to 75% by weight.

10. The printing roller as claimed in claim 1, wherein the thermoplastic material comprises isotactic polypropylene (PP), polyamides (PA) such as polyhexamethyleneadipamide or poly-epsilon-caprolactame, high-pressure or low-pressure polyethylene (PE), poly(phenylene sulfide) (PPS), polyoxymethylene (POM), polyether-ether-ketones or thermoplastic polyesters such as poly(ethylene terephthalate) or poly(butylene terephthalate), or mixtures thereof.

11. The printing roller as claimed in claim 1, wherein the outer surface of the base body is matrix-enriched.

12. The printing roller as claimed in claim 11, wherein the plasma-sprayed layer of copper or copper alloy is arranged on the matrix-enriched outer surface of the base body.

13. The printing roller as claimed in claim 12, wherein the plasma-sprayed layer has a thickness within the range of between 50 and 500 μm.

14. The printing roller as claimed in claim 12, wherein the plasma sprayed layer has a thickness within the range of between 100 and 300 μm.

15. The printing roller as claimed in claim 1, wherein the plasma sprayed layer has a homogenous structure without any oxide interlayers.

16. The printing roller as claimed in claim 1, wherein the plasma sprayed layer has a homogenous structure with a pore-free surface.

17. The printing roller as claimed in claim 1, wherein the plasma sprayed layer has a homogenous structure with a surface roughness $R_a \leqq 0.1$ μm.

18. The printing roller as claimed in claim 1, wherein the copper alloy comprises beside copper the metals zinc, tin, iron, nickel, manganese, silicon, aluminum, lead or mixtures thereof.

19. The printing roller as claimed in claim 1, having a positional deviation in the range of from 0.02 to 0.04 mm and a dimensional deviation in the range from 0.01 to 0.03 mm.

20. A printing roller, comprising a steel core cylinder and a sleeve of plastic, said sleeve comprising a tubular base body composed of fiber-reinforced thermoplastic material and a plasma-sprayed layer of copper or copper alloy coated on the outer surface of the tubular base body.

* * * * *